Jan. 9, 1940.    M. E. SCOVILLE    2,186,842
ELECTRIC CAPACITOR
Filed July 25, 1936
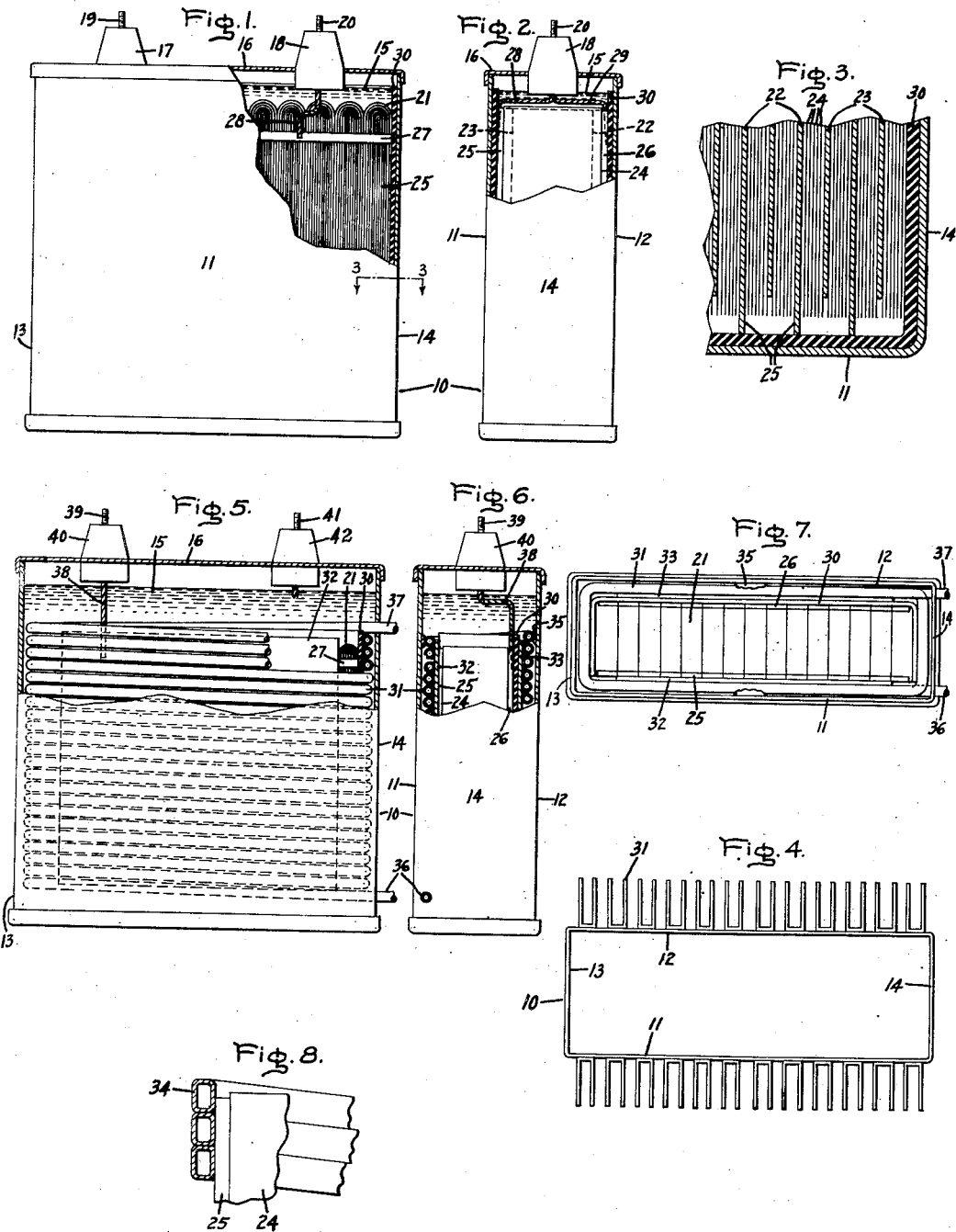
Inventor:
Merritt E. Scoville,
by Harry E. Dunham
His Attorney.

Patented Jan. 9, 1940

2,186,842

UNITED STATES PATENT OFFICE 2,186,842

ELECTRIC CAPACITOR

Merritt E. Scoville, Pittsfield, Mass., assignor to General Electric Company, a corporation of New York Application July 25, 1936, Serial No. 92,620

6 Claims. (Cl. 175—41)

The present invention relates to electric condensers or capacitors and has for a general object the provision of a capacitor having improved construction and arrangement of the elements thereof for obtaining rapid and highly effective dissipation of the heat generated within the capacitor during operation thereof, and which at the same time is simple and economical to manufacture and safe in operation.

One of the more specific objects of the invention is the provision of an improved arrangement of one or more capacity units with respect to a heat dissipating structure whereby, for a given temperature gradient between the interior of the unit or units and the heat dissipating structure, there is obtained a maximum effectiveness of conduction to that structure of the heat generated within the unit or units.

Other objects of the invention and the details of the manner of attaining the objectives will become apparent from the following description taken in conjunction with the accompanying drawing in which Fig. 1 is a front elevation, partially cut away, of a capacitor illustrating an exemplary arrangement of a plurality of capacity units therein in accordance with the present invention; Fig. 2 is an end elevation, partially cut away, of the capacitor of Fig. 1 further clarifying the arrangement of the capacity units; Fig. 3 is an enlarged illustration of a partial section of the capacitor of Fig. 1, taken along the line 3—3; Fig. 4 is a plan view of the casing of a capacitor, similar to that of Fig. 1, illustrating one form of structure applicable thereto for increasing the heat dissipating characteristics of the casing in accordance with the present invention; Fig. 5 is a front elevation, partially cut away, of a capacitor, illustrating a modified form of heat dissipating construction in accordance with a feature of the present invention employing a coil of tubing for the circulation of cooling medium; Fig. 6 is an end elevation, partially cut away, of the capacitor of Fig. 5; Fig. 7 is a plan view of the capacitor of Fig. 5 with the casing cover removed to show further details of the arrangement of the cooling medium coil therein, and Fig. 8 is an enlarged detail illustration of a modified form of tubing for the cooling medium coil applicable in the practice of the present invention.

In the exemplary embodiments of the invention illustrated in the drawing, the capacitor has an enclosing casing or container 10 which is constructed of suitable metal and which has a rectangular form with two opposite side walls 11 and 12 of substantially greater area than the other two opposite side walls 13 and 14 thereof. The top of the container is closed by means of a cover 16 secured thereto in any suitable manner for effecting sealing of the same. Terminal bushings 17 and 18 are carried by the cover with terminals 19 and 20 respectively extending therethrough.

Assembled within the casing or container 10 are a plurality of capacity units 21 which may be of either the stack type or the illustrated flattened roll type with each roll comprising metallic foil armature elements 22 and 23 wound with one or more spacing strips 24 of electric insulating material, such as paper or fabric, interleaved therebetween and with alternate foils displaced in opposite directions with respect to the spacing strips so that marginal edges 25 and 26 of the foils 22 and 23 respectively project beyond the edges of the spacing strips at opposite ends respectively of the rolls as best shown in Figs. 2 and 3. The capacity units, assembled in close side by side relationship, are arranged in the container with the foil layers extending substantially at right angles to the broad sides of the container and the exposed foil edges 25 and 26 adjacent the broad sides 11 and 12 respectively. Within the container is a body of treating medium which impregnates the units and fills the space around the units. This treating medium may consist of any suitable electric insulating compound such as a wax or, as indicated at 15 in the drawing, a liquid such as oil, chlorinated diphenyl and the like.

The actual electrical grouping and connections of the capacity units 21 are immaterial in the practice of the present invention, and it will be understood of course that the number of terminals, such as 19 and 20, will depend upon the particular arrangement employed. For purposes of illustration, all the units or rolls are shown as being connected in parallel by means of conductors or buses 27 respectively secured in any suitable manner, as by soldering, to all the exposed foil edges on the opposite sides of the assembled body of rolls. The one of the conductors 27 which is in contact with the exposed foil edges 25 is connected by means of a lead 28 to the terminal 20 while the other of the conductors 27 which is in contact with the exposed foil edges 26 is connected by means of a lead 29 to the terminal 19. In order to electrically insulate the armature foils from the container 10, a sheet 30 of insulation material is wrapped around the assembled body of rolls. In case it is desired to include the metal container as part of an electric circuit in which the capacitor is to be connected, the container may be electrically connected to one of the terminals and the exposed edges of the foils which are to be connected to that terminal may be disposed in direct contact with the adjacent side of the container without the intervening sheet of insulation. In any case, in the practice of the present invention, the insulation where employed preferably should be as thin as practical and have reasonably good thermal conductivity.

With the internal assembly described in the preceding paragraphs, paths are formed for the transfer of heat from the interior of the capacity body to the heat dissipating structure provided by the broad metallic side walls of the container which paths extend along and substantially coplanar with respect to the foil layers themselves, are of minimum length and maximum area with respect to the dimensions of the foils and the container and are entirely through solid material which for the most part is comprised of the highly thermal conductive metal of the foils and the container walls. Thus the heat transfer paths are free of any gaps of liquid or gas or other unnecessary low thermal conductivity material. In those assemblies in which the exposed foil edges on one side of the capacity body are in direct contact with the adjacent wall of the container, the conduction of the heat from the interior of the body to the container wall is, of course, a maximum for a given temperature gradient between those two points. However, where electric insulation material is interposed between the foil edges and the adjacent heat dissipating walls of the container, it has been found that the effectiveness of the heat transfer by conduction is not materially reduced, provided insulation material of reasonably good thermal conductivity is employed, since the heat transfer paths still extend entirely through solid material and the foil edges are in close and efficient thermal conductive proximity to the container walls. Moreover, the tendency of the projecting foil edges to flatten out during assembly to form almost continuous heat transfer surfaces further increases the effectiveness of the heat exchange between the foils and the walls of the container. It will be evident, therefore, to one skilled in the art, that the effectiveness of the heat transfer with the internal assembly of the present invention is far superior to that obtainable in heretofore commonly employed capacitor constructions wherein the heat is forced to flow from the interior of the capacity body to the heat dissipating structure by circuitous paths or along paths extending transversely of the planes of the layers or laminations of foil and spacing material, which latter paths through a multiplicity of laminations are well known to have very poor thermal conductivity, or in those constructions wherein the heat flow is along paths extending through liquid or gas necessitating heat transfer by convection which is much less effective than heat transfer by conduction. Consequently, it will be seen that the present invention insures a much more effective dissipation of the heat losses from the interior of the capacity body during operation thereof. By reason of this increase in effectiveness of heat loss dissipation it has been made possible greatly to increase the capacity and power rating of a given capacitor without comparable increase in the overall size thereof.

In order to facilitate the heat flow from the walls of casing 10 into the surrounding medium, which may be either air or a water jacketing, and thereby to increase the effectiveness of the casing as a heat dissipating structure, the effective heat dissipating surface thereof may be increased by means of corrugations, fins and the like applied to the walls of the casing. For example, U-shaped fins 31 may be affixed by soldering or welding to the broad sides 11 and 12 of the casing as illustrated in Fig. 4, since by reason of the arrangement of the internal assembly the heat transfer per unit area to these broad side walls is substantially greater than the heat transfer per unit area to the narrow side walls 13 and 14. The fins or other means for increasing the effective heat dissipating surface may be applied to the narrow side walls also if desired and of course would further increase the effectiveness of the casing as a whole as a heat dissipating structure. With fins or the like applied to the broad side walls of the casing an additional advantage is obtained in that these side walls are stiffened and prevented from outward bulging so that the inside surfaces of these side walls are maintained in close proximity with the foil edges to facilitate the transfer of heat from the capacity body to the casing.

The dissipation of heat from the casing 10 may be facilitated also by the addition of a coil of tubing surrounding the capacity body for the circulation of cooling medium in close heat exchange proximity to the exposed foil edges. This tubing, which preferably is constructed of a metal having a good thermal conductivity such as copper, may be disposed either on the outside of the casing or, as illustrated at 31 in the embodiment of Figs. 5 to 7 inclusive, on the inside of the casing, and is wound helically into the form of a rectangularly shaped coil to conform to the shape of the casing. Adjacent turns of the coil are disposed close together in order to present a large heat transfer surface to the capacity body. As a result of the rectangular shape of the coil and the close spacing of the turns there is obtained a maximum cooling capacity with minimum waste space so that a capacitor employing this construction can be made of minimum overall size for a given desired capacity and power rating. With the coil of tubing 31 disposed within the casing and directly surrounding the capacity body, it is necessary, if it is desired to electrically insulate the foils from the metal heat dissipating structure comprising the container or casing and the tubing, to wrap the assembled body of capacity units in a sheet 30 of insulation material in a manner similar to that described in connection with the embodiment of Figs. 1 to 3 inclusive. However, in the event that it is desired to include the metal heat dissipating structure in the electric circuit, the insulation sheet 30 may be dispensed with on one of the exposed foil edge sides of the capacity body so that, as illustrated in Figs. 5 to 7 inclusive, the exposed foil edges on that side, as for example the foil edges 25, are in direct electrically conductive relation as well as thermally conductive relation to the adjacent portions of the metal tubing.

With tubing of circular cross section as employed in the embodiment of Figs. 5 to 7, it is preferable though not necessary to insert plates of good thermal conductivity metal between the foil edges on the opposite sides of the capacity body and the respectively adjacent portions of the tubing. Such plates are illustrated at 32 and 33 disposed with one side of each thereof in direct contact with the interior surface of one of the two opposite broad sides respectively of the rectangular coil of metal tubing, with the other side of plate 32 in direct contact with the exposed foil edges 25 and the other side of plate 33 in direct contact with the electric insulation sheet 30. Thus the plates serve to present continuous flat heat transfer surfaces of large area to the adjacent exposed foil edges. Also the pressure of the plates against the opposite sides of the capacity body tends to flatten out the exposed foil edges so that they too present almost continuous heat transfer surfaces, the surface on the one side formed by the foil edges 25 being in direct contact with the surface of plate 32 while the surface on the other side formed by the foil edges 26 is in contact with the sheet 30 of insulation and therefore in efficient thermal conductive relation to the surface of plate 33.

Substantially continuous heat transfer surfaces of large area in good heat exchange relation to the capacity body may be provided also and without the use of metal plates 32 and 33 by employing rectangular cross section tubing 34, such as that illustrated in Fig. 8, with the tubing wound so that flat sides of adjacent layers or turns of the coil are in abutment and inwardly facing flat sides of the turns, at right angles to the abutting sides of the turns, form a substantially continuous flat surface in heat exchange relation to the capacity body. The rectangular cross section of the tubing, in addition to eliminating the need for the heat transfer plates, also makes possible a maximum length of tubing within the casing and a minimum of space between the surface areas of adjacent turns which are in contact or substantial contact with the foil edges, and therefore results in an even greater economy of space in the construction of a capacitor. A further advantage of the rectangular cross section tubing is that it presents a maximum area of internal tube surface to the cooling medium circulated therethrough.

In order to anchor the cooling medium tubing within the casing 10, the inner surfaces of the broad sides of the casing may be provided with bosses arranged to engage one or more turns of the tubing or the turns of tubing may be tacked to the walls of the casing by means of solder as indicated at 35 in Figs. 6 and 7. The opposite ends of the coil of tubing are brought out of the casing at any desired and convenient points, as, for example, through one of the narrow side walls of the casing as indicated at 36 and 37, to provide for the connection thereto in any suitable manner of a supply of cooling medium to be circulated through the coil.

The interior of casing or container 10 is filled with a body of electric insulating compound 15 as set forth in connection with the first embodiment described. Foil edges 26, which are electrically insulated from the heat dissipating structure by insulating sheet 30, are connected by means of a conductor or bus, similar to that indicated at 27 in Fig. 1, and a lead 38 to a terminal 39 supported on the cover of the casing by means of a bushing 40. For the connection of the opposite exposed foil edges 25 in an electric circuit through the heat dissipating structure comprising the coil of tubing and the metal casing, there may be provided a second terminal 41 supported on the cover by bushing 42 and adapted to be connected in any suitable manner to the casing, or the connection of the electric circuit may be made directly to the casing itself in any suitable and well known manner. As previously pointed out, the particular electrical grouping and connections of the capacity units are immaterial to the practice of the present invention.

With the arrangements just described, the transfer of heat from the interior of the capacity body to the heat dissipating structure is very effective since the heat transfer paths are short and comprised entirely of solid material of good thermal conductivity. With respect to the heat flow out of one side of the body, the heat transfer paths have maximum thermal conductivity and minimum length since they extend along the layers of one of the metallic foils and the exposed marginal edges 25 thereof directly to the heat transfer plate 32 and circular cross section cooling coil 31 in the one case, and directly to the heat transfer surface of the rectangular cross section cooling coil 34 in the other case. The heat flow from the interior of the capacity body out of the other side thereof also is through continuous solid paths of good thermal conductivity comprised by the layers of the other one of the metallic foils and the exposed marginal edges 26 thereof, through the sheet of electric insulation 30, which preferably has good thermal conductivity, and thence in the one case to the heat transfer plate 33 and cooling coil 31 and in the other case directly to the heat transfer surface provided by the rectangular cross section tubing 34. Thus the cooling medium, which may be water or any other suitable fluid, is circulated through the tubing in very efficient heat exchange relation to the capacity body and is effective rapidly to absorb and carry away the heat generated within the capacity body during operation thereof. The effectiveness of the heat dissipation is further insured in that any of the heat from the capacity body which may not be carried away by the cooling medium, is conducted through the metal of the cooling coil and thence to the heat dissipating side walls of the casing since, as will be seen from the drawing, the side walls are at all points in relatively close heat exchange proximity to portions of the cooling coil and at certain points are conductively connected directly to the cooling coil as, for example, at the tacking points 35 and at the points where the tubing passes through the casing wall. Hence, as with the embodiment of Figs. 1 to 3 first described, the heat transfer paths are not interrupted by unnecessary low thermal conductive material or by gaps of liquid or gas and the heat transfer from the interior of the capacity body to the heat dissipating structure is nowhere dependent upon convection in liquids or gases.

From the foregoing it will be evident to those skilled in the art that the present invention is not limited to the precise details of the arrangements and constructions illustrated and that various modifications, changes and combinations of the disclosed features may be made in order to apply the invention to particular conditions encountered. It is to be understood, therefore, that the appended claims are intended to cover all such modifications, changes and combinations as fall within the true spirit and scope of the invention.

What I claim as new and desire to secure by Letters Patent in the United States is:

1. In a capacitor, the combination of a container, an electric capacity body disposed in said container and including interleaved conductive foil layers and spacing material layers assembled with edges of different ones of the foil layers projecting beyond the spacing material layers respectively on different sides of said body, a body of treating medium in said container surrounding said capacity body, and heat dissipating means including a coil of metal tubing adapted for the passage of cooling medium therethrough from a source external of said container and carried by said casing in surrounding relation to said capacity body with portions of the tubing in solid heat exchange relation with the projecting edges of the said foil layers throughout an extended area of said sides of the capacity body.

2. In a capacitor, the combination of a substantially rectangular metal container having two opposite side walls substantially broader than the other two opposite side walls thereof, a plurality of rolled capacity units each comprising metal foils wound with spacing material interposed therebetween and with marginal edges of different of the foils exposed beyond the edges of the spacing material respectively at opposite ends of the rolled units, said rolled units being arranged in said container in compact side by side relationship with their opposite exposed foil edges respectively adjacent said broader side walls of the container, a body of treating medium substantially filling said container and impregnating said units, a substantially rectangularly shaped coil of metal tubing nested in said container in surrounding relation to all said rolled units and with portions of the tubing in solid heat exchange relation to said exposed foil edges, and means providing for the connection of a cooling medium supply to said tubing.

3. In a capacitor, the combination of a container, a body of liquid treating medium in said container, an electric capacity body immersed in said medium and including conductive foils assembled compactly with spacing material interposed therebetween and with edges of opposite potential foils exposed beyond said spacing material respectively on different sides of said capacity body, heat dissipating means including a coil of tubing adapted for the circulation of cooling medium therethrough and disposed in said container in surrounding relation to said capacity body with extensive portions of said tubing in solid thermal conductive relation to the exposed foil edge sides of said capacity body, and means providing for the connection of said tubing with a supply of cooling medium external of said container.

4. In a capacitor, the combination of a container, a body of liquid treating medium in said container, an electric capacity body immersed in said medium and including conductive foils interleaved with spacing material and with edges of opposite potential foils exposed respectively on different sides of said capacity body, which said sides are substantially flat and of extensive area, heat dissipating means including a plurality of layers of metal tubing disposed in said container in closely proximate surrounding relation to said capacity body, which said tubing is of non-circular cross-section with at least one substantially flat side, said layers of tubing being arranged in close side by side relationship with a flat side thereof toward said capacity body so as to present extensive substantially continuous flat heat exchange surfaces to the capacity body, means including said exposed foil edges providing short solid heat transfer paths between said sides of the capacity body and said surfaces of the tubing, and means providing for connection of said tubing with a cooling medium supply external of said container.

5. In a capacitor, the combination of a container, a body of treating medium in said container, an electric capacity body immersed in said medium and including a multiplicity of layers of conductive foil assembled compactly with interleaved spacing material and with edges of opposite potential foils exposed respectively on different sides of the capacity body, which said exposed foil edge sides are of extensive area, a plurality of heat transfer plates disposed respectively with surfaces thereof in solid thermal conductive relation to said exposed foil edge sides of the capacity body throughout an extensive area, cooling medium circulation conduit means in said container arranged extensively in solid thermal conductive relation to said surfaces of said plates, and means providing for connection of said conduit means with a supply of cooling medium external of said container.

6. In an electric capacitor, the combination of an enclosing container, an electric capacity body disposed in said container and including a multiplicity of layers of thin conductive metallic foil interleaved with spacing material layers, terminal means respectively for opposite potential ones of said foil layers, a body of treating medium in said container surrounding said capacity body, at least some of said metallic foil layers having portions thereof projecting outwardly beyond said spacing material layers on one side of said capacity body so as to form a heat exchange surface of considerable area, heat dissipating means including a coil of metal tubing disposed in said container in closely surrounding relation to said capacity body and having means provided for connection with a supply of cooling medium external of said container, and means including said projecting foil layer portions providing solid paths, of good heat conductivity and extensive area, between said side of said capacity body and adjacent portions of said coil of tubing.

MERRITT E. SCOVILLE.